United States Patent [19]

Williams

[11] Patent Number: 5,365,033

[45] Date of Patent: Nov. 15, 1994

[54] METHOD OF PRODUCING A MULTI-APERTURED COMPONENT

[75] Inventor: Edward C. Williams, Derby, United Kingdom

[73] Assignee: Elliott Industries Limited, London, United Kingdom

[21] Appl. No.: 994,511

[22] Filed: Dec. 21, 1992

[30] Foreign Application Priority Data

Dec. 19, 1991 [GB] United Kingdom ............... 9126929

[51] Int. Cl.⁵ .................................... B23K 26/00
[52] U.S. Cl. ........................ 219/121.71; 219/121.83; 219/121.84
[58] Field of Search .......... 219/121.7, 121.71, 121.83, 219/121.84

[56] References Cited

U.S. PATENT DOCUMENTS 5,117,087  5/1992  Baker et al. ................. 219/121.71

Primary Examiner—C. L. Albritton
Attorney, Agent, or Firm—Watson, Cole, Grindle & Watson

[57] ABSTRACT

A method of producing a multi-apertured component for providing a predetermined fluid flow includes the steps of dividing the component into regions in which the apertures are to be formed, forming a portion of the apertures in a first region in accordance with assumed parameters, measuring the fluid flow through the apertures and correcting, if necessary, the assumed parameters for the apertures in the first region to provide the fluid flow required through the first region and the assumed parameters for each of the other regions, and completing drilling of the apertures in the first region and in each of the other regions.

10 Claims, 3 Drawing Sheets

METHOD OF PRODUCING A MULTI-APERTURED COMPONENT

BACKGROUND OF THE INVENTION

1. Field of the Invention

The present invention relates to a method of producing a multi-apertured component having in use a fluid flow therethrough which is as close as possible to a predetermined value. The invention is applicable in particular to the production of components for a gas turbine, such as turbine blades or combustor cooling rings.

In producing components of the above-mentioned type, it is desirable that the fluid flow through the apertures be as close as possible to a predetermined desired value. Conventionally, the apertures are formed (such as by laser drilling) using specific process parameters and, after all of the apertures having been so produced, the overall fluid flow through the component is measured to check that it comes reasonably close to the desired value. Using this technique, it is possible to achieve a typical tolerance of ±10%.

2. The Prior Art

EP-A-0417917 discloses methods of forming multi-apertured components to much closer tolerances in which a first aperture or a first series of apertures is formed in a component and, subsequently at least one further aperture or at least one further series of apertures is formed in the component, prior to the formation of each such further aperture or series of apertures, the fluid flow through substantially all of the previously-formed apertures is measured, the measured fluid flow is compared with the predetermined value, and the size of the further aperture or further series of apertures is adjusted in accordance with the comparison.

U.K. Patent Publication No. 2239206 discloses a process for measuring the size of high-precision through-bores produced by laser radiation in workpieces during a boring process. Each bore is made by means of a plurality of successive energy pulses, the focal points of which are offset relative to one another in relation to the bore axis. The measurement variable is obtained from a fluid flowing through the through-bore and supplied to the boring point of the workpiece at a predetermined constant pressure. An enclosure for the fluid is provided by a chamber whose pressure is monitored in a bore to provide control of the laser in response to a comparator which also receives a desired value from a transmitter.

Desirably, the fluid flow is measured as a pressure differential across the apertures produced by a constant mass flow of fluid. The constant mass flow of fluid is advantageously produced using a critical flow nozzle and a pressure regulator upstream thereof.

SUMMARY OF THE INVENTION

This invention provides a method of producing a multi-aperture component for providing a predetermined air flow comprising the steps of: dividing the areas of the component in which the holes are to be formed into regions, drilling a proportion of the holes in one region in accordance with predetermined parameters, measuring the air flow through the drill holes in the region and comparing the measured flow with the predetermined required flow for holes in that region, if the air flow achieved does not meet the predetermined required flow, calculating a primary correction to the parameters for controlling the drilling of the holes in the further regions of the component and a secondary correction to the parameters for the remaining holes to be drilled in the first-mentioned region so that the air flow in the latter reaches the predetermined requirement, and then drilling the requisite holes in the further regions using the same sequence of operations in accordance with the secondary corrective parameters, continuing to adjust the parameters after drilling of each region as necessary, and then drilling the un-drilled holes in the or each region in accordance with the primary corrected parameters.

The present invention will now be further described, by way of example only, with reference to the accompanying drawings.

DESCRIPTION OF THE PREFERRED EMBODIMENTS

Figure 1:
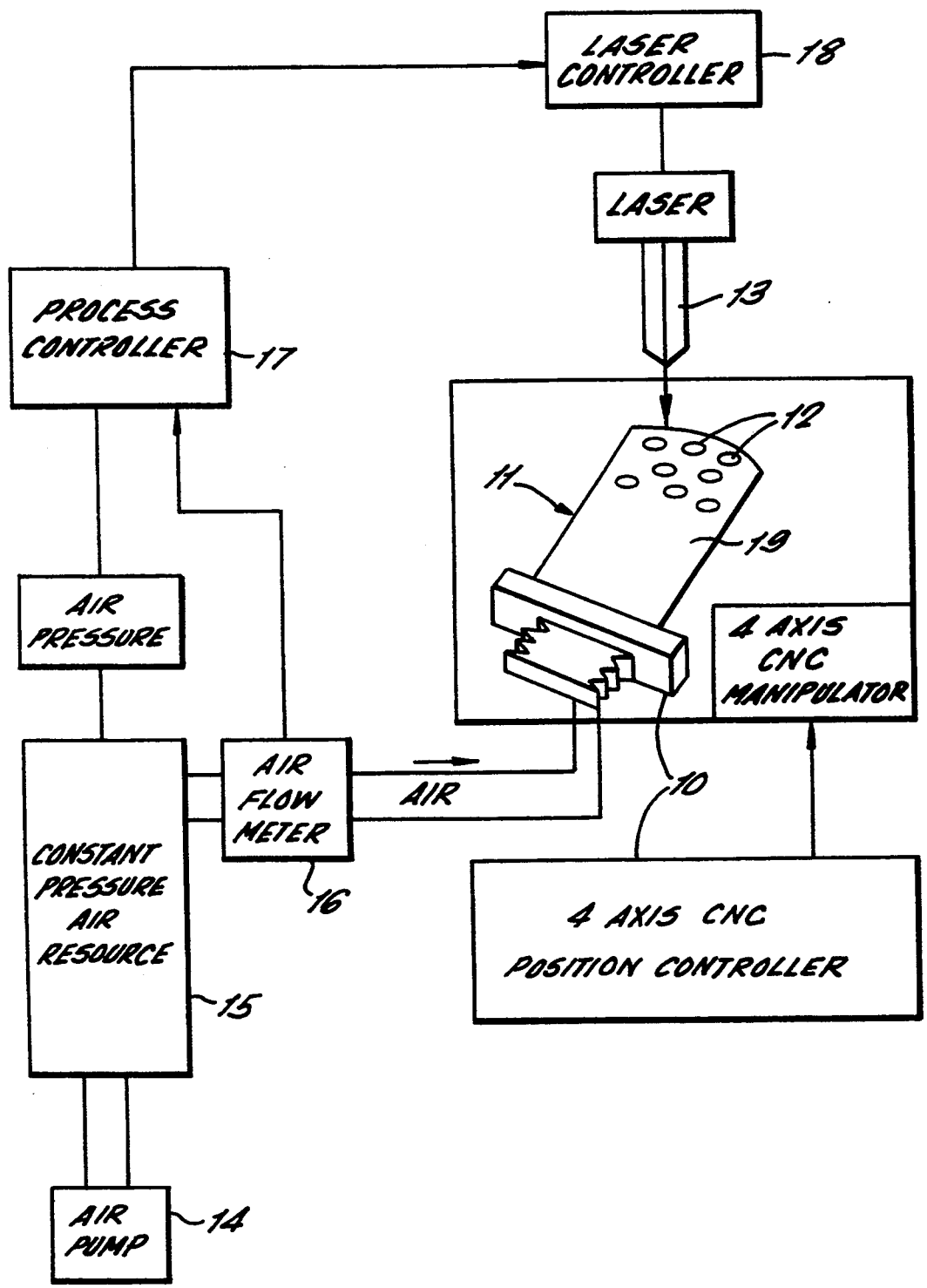
FIG. 1 is a schematic diagram of apparatus for performing the method of the invention, as applied to a gas turbine blade.

Referring first to FIG. 1, the illustrated apparatus of EP-A-0417917 is shown comprising generally a numerically-controlled manipulator 10 on which is mounted a component 11 in which apertures 12 are to be formed, and a laser drill 13 for producing the apertures 12. Air is supplied to the component 11 by way of a pump 14 and a constant pressure air reservoir 15, and the flow of air through the apertures 12 is measured by a flow meter 16. The meter 16 in turn supplies signals to a process controller 17 which is also responsive to the source air pressure, and a laser controller 18 controls operation of the laser drill 13 under command from the process controller 17.

In use, the laser drill 13 forms a first aperture in the component 12 at preset parameters of laser pulse power, pulse duration and focal length. The air flow through that aperture is then measured by the meter 16 and is compared by the process controller 17 with a predetermined desired value of air flow. The process parameters of the laser drill 13 are then adjusted so that, when the drill subsequently produces a second aperture in the component, the dimensions of this aperture are increased or decreased towards a value to give the desired overall air flow. The combined air flow through both apertures is then measured, and the laser drill parameters are again suitably adjusted for the production of a third aperture. This process is repeated until the desired number of apertures have been produced: prior to each laser drilling operation, the combined air flow through all of the previously-formed apertures is measured, and the process parameters of the laser drill 13 are adjusted so that each new aperture is sized to bring the overall air flow closer to the predetermined desired value.

Figure 2:
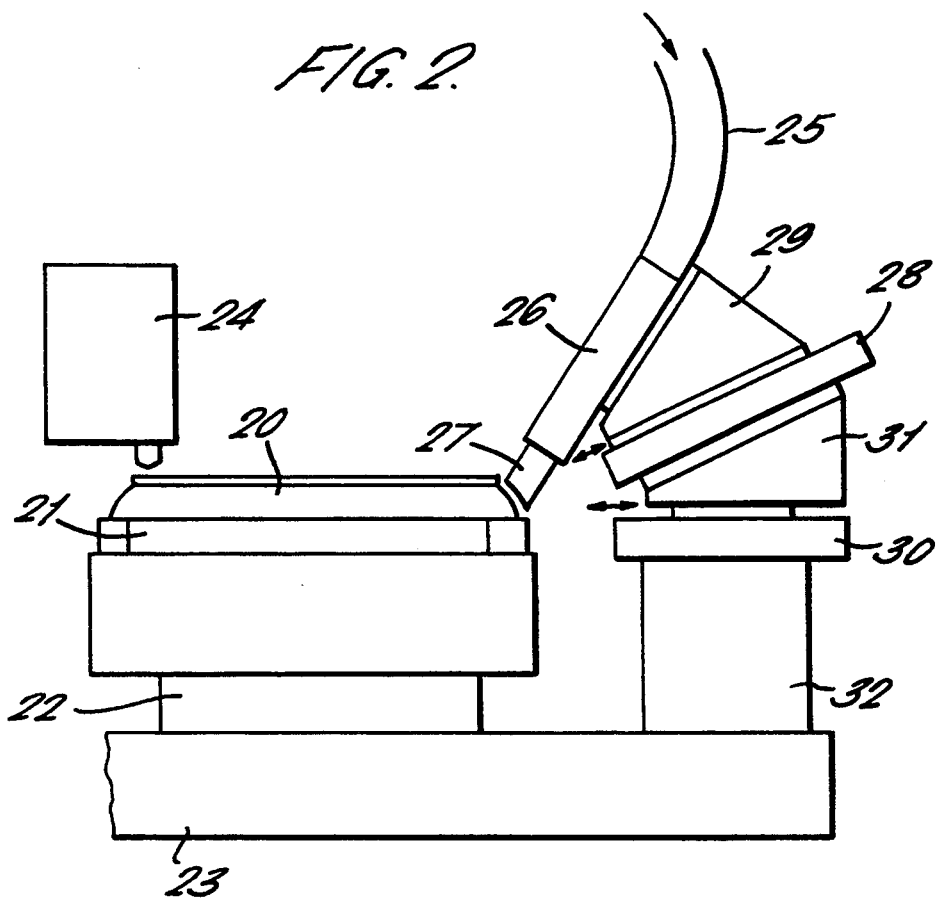
FIG. 2 is a side view of apparatus for performing the method of the invention, as applied to a combustor cooling ring.
Figure 3:
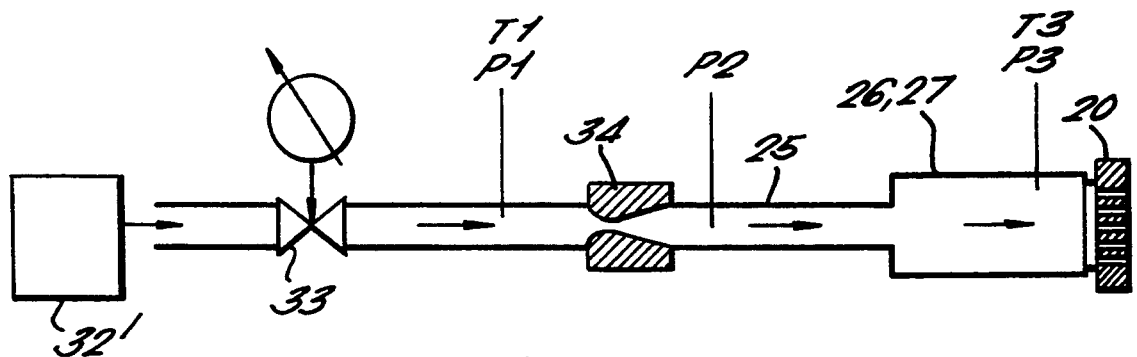
FIG. 3 is a diagram of part of the apparatus shown in FIG. 1.

The apparatus of FIG. 1 illustrates the formation of apertures in a turbine blade 19. However, the technique can be applied to many other types of component, and FIGS. 2 and 3 show the invention as applied to a combustor cooling ring 20 of a gas turbine engine. The cooling ring 20 is mounted on a fixture 21 on a rotary table 22, which is in turn supported by a carriage 23 for rectilinear movement in a Y-axis direction. A laser drilling head 24 is positioned adjacent to the ring 20 on a mounting which permits movement in X- and Z-axis directions. Also positioned adjacent to the ring 20 is an operative end of a flow measuring device (to be described in detail later), comprising a flow pipe 25, a flow straightener 26 and a flow adaptor 27 in the forth of a flexible rubber boot. The device is carried on an approach slide 28 through the intermediary of an approach spacer 29 while the slide 28 is in turn carried by a clearance slide 30 by way of a further approach spacer 31. The whole assembly is mounted on a plinth 32 which upstands from the Y-axis carriage 23.

The flow measuring device is shown in detail in FIG. 3, and comprises a supply 32' of clean dry air which passes via a pressure regulator 33 to the upstream side of a critical flow nozzle 34, the downstream side of the nozzle being connected to the aforementioned flow pipe 25, flow straightener 26 and flow adaptor 27. So long as the pressure P1 of the air upstream of the nozzle 34 is maintained at at least double the pressure P2 on the downstream side thereof, the flow rate through the nozzle 34 for a given temperature T1 will be directly proportional to the pressure P1, irrespective of the value of the pressure P2 of the air downstream of the nozzle. Thus, a constant mass flow of air can be applied to the combustor ring 20 by regulating the pressure P1 using the regulator 33, and the pressure differential P3 across the apertures is then measured.

The combustor cooling ring 20 typically needs to have two parallel, circumferentially-extending rows of apertures formed therein, there being about 1000 equally spaced apertures in each row. Typically also, it is desired that each sector of the ring composed of, say, 40 apertures has a closely defined air flow therethrough, and that the overall ring also has a total air flow which is close to a predetermined value. To produce each sector, the laser drill 24 is first used to form, say, 30 of the 40 apertures. The sector is then positioned adjacent to the flow measuring device, and the latter is manipulated using the slides 28 and 30 to clamp the adaptor 27 against the exterior of the ring 20 and embracing the thirty apertures which have already been formed. The combined air flow through those apertures is then measured, and is compared with the desired, predetermined value for the sector. Suitable adjustments are then made to the process parameters of the laser drill 24, and the sector is returned to the drilling head so that the remaining ten apertures can be formed to those parameters.

In actual practice, a master apertured component is first set up on the apparatus and the flow characteristics for a given pressure differential are measured. The component proper to be machined is then set up on the apparatus. After the first series of apertures have been formed in the component proper, the process parameters of the laser drill are altered to give a change in diameter of the aperture as follows:

$$\Delta D = \frac{-D}{4} \frac{(\Delta P3g)}{(CSF \cdot P1^2)} \frac{(T1)}{(T3)}$$

where
D is the aperture diameter

P1 is the absolute input pressure to the critical flow nozzle

P3g is the gauge input pressure to the component being tested $\Delta P3g$ is the pressure error relative to the master T1 is the absolute temperature of the air at the input to the critical flow nozzle T3 is the absolute temperature of the air at the input to the component being tested, and CSF is a calibration scale factor obtained from the initial measurement on the master, calculated in accordance with the following formula:

$$CSF = \frac{P3g(CAL)}{P1^2(CAL)} \frac{(T1)}{(T3)}$$

where

P3g(CAL) is the value of P3g as measured on the master, and

P1(CAL) is the absolute input pressure to the critical flow nozzle during mastering.

Figure 4:
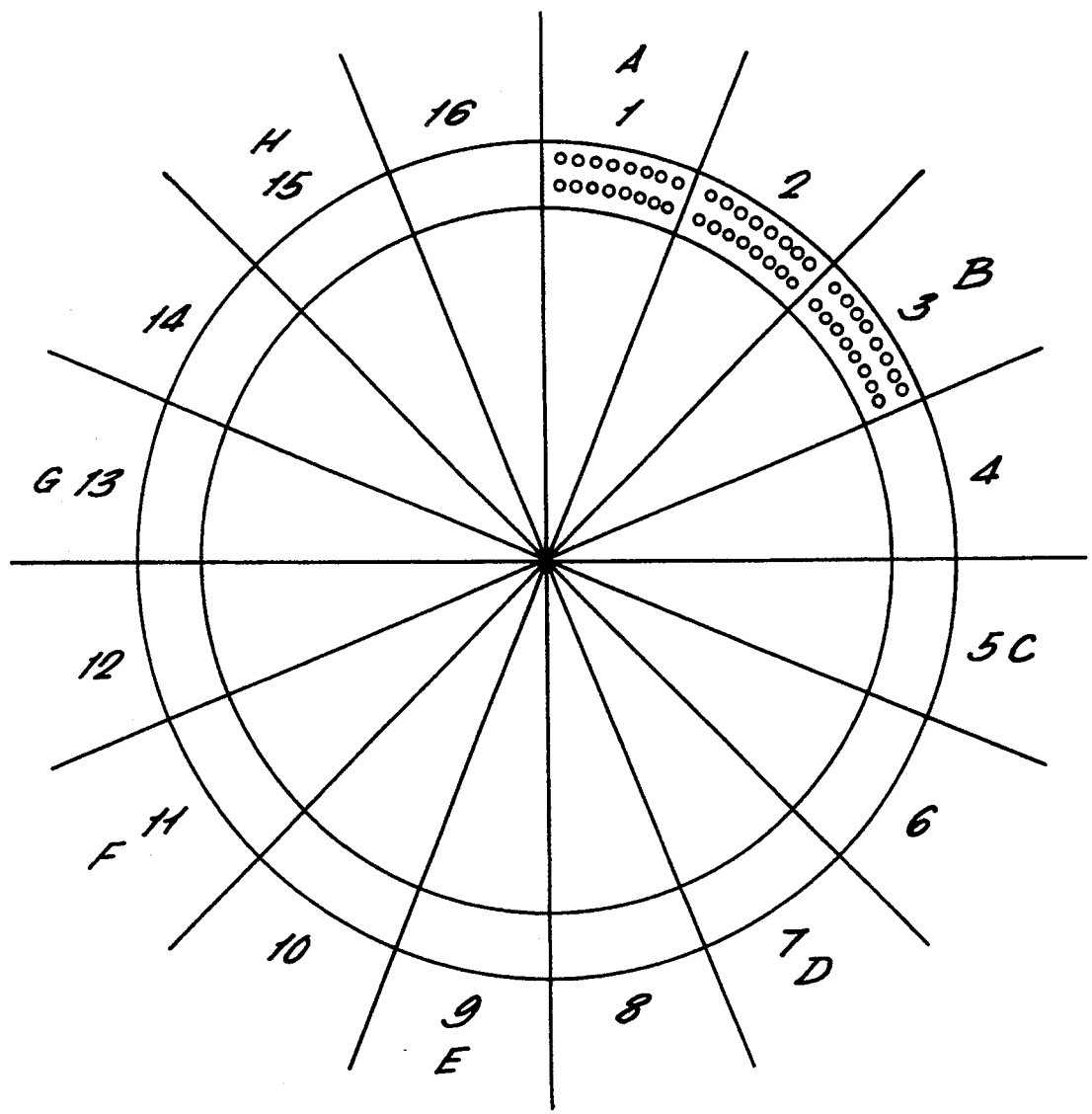
FIG. 4 is a diagrammatic view of a component to be drilled in accordance with the invention.

In accordance with the present invention the above method is modified as follows:

1. The ring is divided into a number of sectors composed of say, 40 apertures desired to have a closely defined air flow therethrough (refer to FIG. 4).
2. The laser drill is positioned at the first drill sector—say sector 'A'.
3. A proportion, say 30 out of 40 of the apertures in this sector is drilled.
4. The air flow through these 30 holes is measured.
5. If the air flow is correct, then go to stage 11 below, otherwise continue to stage 6.
6. Two suitable adjustments called: PRIMARY ADJUSTMENT, and SECONDARY ADJUSTMENT, are calculated.
7. The sector is returned to the drilling head and form the remaining 10 holes using the SECONDARY ADJUSTMENT to the process parameters of the laser drill, thus obtaining the correct overall air flow through this sector.
8.* The laser head is moved to another undrilled sector (sector B, C, D . . . ). (If another sector is not available go to stage 11).
*NOTE: the sectors referred to in stage 8 need not be contiguous to allow for the air flow boot to seal onto the component.
9. The laser parameters are adjusted using the PRIMARY adjustment.
10. Go back to stage 3.
11. All remaining holes are drilled using the final PRIMARY process parameters obtained.
12. As an alternative to the step of stage 11: drill a number of remaining holes and sectors which may be either preset or governed by the stability of the process which may be determined by suitable statistical analysis of the air flow measurements.

The main differences between the Example of the present described invention above and the method disclosed in EP-A-0417919 are:

(a) that not all sectors have to be partially drilled and air flowed; and
(b) that PRIMARY and SECONDARY ADJUSTMENTS are used.

The main advantage is that component processing cycle time is reduced because the amount of air flowing is less.

In the case where the number of sectors into which the ring is divided is a single sector, then the part is completed after stage 7.

Although the description refers to PRIMARY and SECONDARY adjustment steps, the technique can be extended to several stages of adjustment on a particular sector.

For example, in a 40 hole sector we could consider:

| PRIMARY | 30 holes | |
|---|---|---|
| SECONDARY | 5 holes | (total 35) |
| THIRD | 3 holes | (total 38) |
| FINAL | 2 holes | (total 40) |

This is particularly relevant to single sector components where the requirement is for a very precise overall flow.

PRIMARY CORRECTION FORMULA $\Delta d$ (PRIMARY) =

$$-\frac{do}{3}\left[1 - \sqrt{\frac{3 \cdot CSF \cdot p1^2 \cdot T3 - P3g \cdot T1 \cdot Pa}{2 \cdot P3g \cdot T1 \cdot Pa}}\right]$$

or, if T3—T1 (within 5° C.) then:

$$\Delta d \text{ (PRIMARY)} = -\frac{do}{3}\left[1 - \sqrt{\frac{3 \cdot CSF \cdot p1^2 - P3g \cdot Pa}{2 \cdot P3g \cdot Pa}}\right]$$

may be used.

SECONDARY CORRECTION FORMULA $$\Delta d \text{ (SECONDARY)} = \frac{n}{(n-m)} \cdot \Delta d \text{ (PRIMARY)}$$

where:
$\Delta d$(PRIMARY) is the primary adjustment to aperture size
$\Delta D$(SECONDARY) " " secondary " " " "
n is the number of apertures in a complete sector
m is the number of apertures drilled first in the sector
do is the aperture diameter required
P1 is the absolute input pressure to the flow nozzle
P3g is the gauge pressure to the component being tested
Pa is absolute atmospheric pressure
T1 is the absolute air temperature at the input to the critical flow nozzle
T3 is the absolute air temperature of the air at the input to the component being tested; and
CSF is a calibration scale factor obtained from the initial measurement on the master calculate in accordance with the following formula:

$$CSF = \frac{P3g(CAL) \cdot Pa(CAL)}{P1^2(CAL)} \cdot \left(\frac{T1(CAL)}{T3(CAL)}\right)$$

where:
P3g(CAL) is the value of P3g measured on the master
P1(CAL) is the absolute input pressure to the critical flow nozzle during mastering
Pa(CAL) is the atmospheric pressure during mastering
T1(CAL) is the absolute air temperature at the input to the critical flow nozzle during mastering T3(CAL) is the absolute air temperature at the input to the master component during mastering.
If T1(CAL)≃T3(CAL) (within say 5° C.) then:

$$CSF = \frac{P3g(CAL) \cdot Pa(CAL)}{P1^2(CAL)}.$$

may be used instead.

The advantages of the above formula over those described in the original patent are
(a) They are completely independant of atmospheric pressure variations and hence less frequent mastering is required;
(b) because the CSF is now a constant, it can be precalculated as an alternative to using a master component; and
(c) the formula is based on second order approximation to the error and gives a more accurate estimate of required adjustment when the initial flow error is large.

The laser drill 24 can form the apertures by trepanning or by percussion drilling, i.e., with a small thickness of material being removed with each laser pulse, until breakthrough is achieved. In the latter case, each aperture can be completely formed before the laser drill moves on to produce the next aperture: however, this does mean that the combustor ring 20 is continually stopped and started in its rotary movement. As an alternative, the apertures can be produced "on the fly", that is to say, the drilling head 24 can be keyed to specific aperture locations around the circumference of the ring 20, and the ring can be rotated while the drill removes successive thicknesses of material at each aperture location on successive passes. In this way, each aperture receives a single laser pulse on each pass, and the apertures are all formed progressively over a number of rotations of the ring, thus enabling the ring to be rotated continuously at least until the first thirty apertures in each section have been formed. Alternatively, some holes may be drilled by conventional percussion drilling and the remainder driller using "drilling-on-the-fly".

It has been found that, using the above-described technique, an apertured component can be produced wherein the actual air flow through the apertures is within a much closer tolerance than has been possible previously. This gives rise to an increased efficiency in the gas turbine system and can cause great economic benefit to the end user, particularly in the case of gas turbines of relatively large power ratings. Compensation for air pressure and air temperature is provided for, and also for any non-linearity in the air flow for apertures in different parts of the component. The flow measurements can, if desired, be taken continously and readings made in a cycle so the system responds very quickly to any variations needed in the laser drill process parameters.

Although the above description refers specifically to components such as blades and combustion cooler rings for gas turbines, it will be appreciated that the invention has much more general applicability than this. Also, the invention can be applied not just to laser drilling but to any other process for producing apertures in a component, such as spark erosion machining. Furthermore, the invention can be applied to components where a fluid other than air is intended to flow through the apertures.

I claim:

1. A method of producing a multi-apertured component for providing a predetermined fluid flow comprising the steps of;

dividing the component into regions in which apertures are to be formed, forming a proportion of the apertures in a first region in accordance with assumed parameters, measuring the fluid flow through said apertures and correcting, if necessary, the assumed parameters for the apertures in the first region to provide the fluid flow required through the first region and the assumed parameters for each of the other regions, and completing forming of the apertures in the first region and each of the other regions.

2. A method as claimed in claim 1, wherein a proportion of the apertures in a second region is formed in accordance with the corrected parameters for the region, the fluid flow through the formed apertures is measured and compared with the required fluid flow and the corrected parameters are re-corrected for the balance of the holes for that region and for each further region if necessary and so on until each region has been fully formed.

3. A method as claimed in claim 2, wherein a proportion of the apertures is formed in each region first until the corrected parameter produce apertures which meet the predetermined flow and thereafter all of the apertures in all the or each remaining regions are formed in accordance with the last corrected parameters.

4. A method of drilling as claimed claim 1, wherein the fluid flow is measured as a pressure differential across the apertures produced by a constant mass flow of fluid.

5. A method as claimed in claim 4, wherein the constant mass flow of fluid is produced using a critical flow nozzle and a pressure regulator upstream thereof.

6. A method as claimed in claim 1, wherein the apertures are formed using a laser machining process.

7. A method as claimed in claim 1, wherein the component is circular or annular and the regions in which the component is formed with apertures are sectors of the component around the axis thereof.

8. A method as claimed in claim 1, wherein after forming said proportion of apertures in said first region, the parameters used for forming the remaining apertures in the region are altered to give a change in aperture diameter in accordance with the formula $$\Delta d \text{ (SECONDARY)} = \frac{n}{(n - m)} \cdot \Delta d \text{ (PRIMARY)}$$

and the corrections for aperture diameter in each of the other regions are varied in accordance with the formula $$\Delta d \text{ (PRIMARY)} = -\frac{do}{3}\left[1 - \sqrt{\frac{3 \cdot CSF \cdot p1^2 \cdot T3 - P3g \cdot T1 \cdot Pa}{2 \cdot P3g \cdot T1 \cdot Pa}}\right]$$

where T3 is greater than T1 by more than 5° C. and where:

d (PRIMARY) is the primary adjustment to aperture size,
d (SECONDARY) is the secondary adjustment to aperture size,
n is the number of apertures in a complete sector,
m is the number of apertures drilled first in the sector,
do is the aperture diameter required,
P1 is the absolute input pressure to the flow nozzle,
P3g is the gauge pressure to the component being tested,
T1 is the absolute air temperature at the input to the critical flow nozzle,
T3 is the absolute air temperature of the air at the input to the component being tested; and
CSF is a calibration scale factor obtained from the initial measurement on the master calculated in accordance with the following formula:

$$CSF = \frac{P3g(CAL) \cdot Pa(CAL)}{P1^2(CAL)} \cdot \frac{T1(CAL)}{T3(CAL)}$$

where
P3g(CAL) is the value of P3g measured on the master,
P1(CAL) is the absolute input pressure to the critical flow nozzle during mastering,
Pa(CAL) is the atmospheric pressure during mastering,
T1(CAL) is the absolute air temperature at the input to the critical flow nozzle during mastering,
T3(CAL) is the absolute air temperature at the input to the master component during mastering.

9. A method as claimed in claim 1, wherein after forming said proportion of apertures in said first region the parameters used for drilling the remaining apertures in the region are altered to give a change in aperture diameter in accordance with the formula $$\Delta d \text{ (SECONDARY)} = \frac{n}{(n - m)} \cdot \Delta d \text{ (PRIMARY)}$$

and the corrections for aperture diameter in each of the other regions are varied in accordance with the formula:

$$\Delta d \text{ (PRIMARY)} = -\frac{do}{3}\left[1 - \sqrt{\frac{3 \cdot CSF \cdot p1^2 - P3g \cdot Pa}{2 \cdot P3g \cdot Pa}}\right]$$

in the case where T3−T1 is less than 5° C., and where
d (PRIMARY) is the primary adjustment to aperture size,
d (SECONDARY) is the secondary adjustment to aperture size,
n is the member of apertures in a complete sector,
m is the number of apertures drilled first in the sector,
do is the aperture diameter required,
P1 is the absolute input pressure to the flow nozzle,
P3g is the gauge pressure to the component being tested,
T1 is the absolute air temperature at the input to the critical flow nozzle,
T3 is the absolute air temperature of the air at the input to the component being tested; and
CSF is a calibration scale factor obtained from the initial measurement on the master calculate in accordance with the following formula:

$$CSF = \frac{P3g(CAL) \cdot Pa(CAL)}{P1^2(CAL)} \cdot \frac{T1(CAL)}{T3(CAL)}$$

where:
P3g(CAL) is the value of P3g measured on the master,

P1(CAL) is the absolute input pressure to the critical flow nozzle during mastering,
Pa(CAL) is the atmospheric pressure during mastering,
T1(CAL) is the absolute air temperature at the input to the critical flow nozzle during mastering,
T3(CAL) is the absolute air temperature at the input to the master component during mastering.

10. A method as claimed in claim 8 and in the case where T1(CAL)≃T3(CAL) then CSF is calculated in accordance with the formula:

$$CSF = \frac{P3g(CAL) \cdot Pa(CAL)}{P1^2(CAL)}.$$

* * * * *